(12) United States Patent
Gadkaree et al.

(10) Patent No.: US 6,258,334 B1
(45) Date of Patent: Jul. 10, 2001

(54) MERCURY REMOVAL CATALYST AND METHOD OF MAKING AND USING SAME

(75) Inventors: Kishor P. Gadkaree; Tinghong Tao, both of Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/528,616

(22) Filed: Mar. 20, 2000

Related U.S. Application Data

(62) Division of application No. 09/116,183, filed on Jul. 15, 1998, now Pat. No. 6,136,749.
(60) Provisional application No. 60/053,970, filed on Jul. 28, 1997.

(51) Int. Cl.[7] .......................... B01D 53/46; B01D 57/00; B01D 15/00; B01D 53/02
(52) U.S. Cl. ................ 423/210; 423/215.5; 210/660; 210/679; 95/134; 95/901

(58) Field of Search .................. 423/210, 215.5; 210/660, 679; 95/134, 901

(56) References Cited

U.S. PATENT DOCUMENTS

| | | | |
|---|---|---|---|
| 4,491,609 | * | 1/1985 | Degel et al. .................... 502/417 |
| 4,500,327 | * | 2/1985 | Nishino et al. .................... 55/72 |

* cited by examiner

*Primary Examiner*—Elizabeth D. Wood
(74) *Attorney, Agent, or Firm*—Anca C. Gheorghiu

(57) ABSTRACT

An activated carbon catalyst having sulfur dispersed homogeneously thereon, the sulfur being chemically bonded to the activated carbon. A method of making the catalyst involves forming an intimate mixture of a synthetic carbon precursor and a sulfur-containing material, curing the carbon precursor, carbonizing the carbon precursor, activating the carbonized carbon precursor to produce an activated carbon catalyst having sulfur chemically bonded to said activated carbon and uniformly dispersed thereon.

3 Claims, 2 Drawing Sheets

ESCA data for inventive example 1

MERCURY REMOVAL CATALYST AND METHOD OF MAKING AND USING SAME

This is a division of application Ser. No. 09/116,183, filed Jul. 15, 1988, now U.S. Pat. No. 6,136,749.

This application claims the benefit of U.S. Provisional Application No. 60/053,970, filed Jul. 28, 1997, entitled MERCURY REMOVAL CATALYST AND METHOD OF MAKING AND USING SAME, by Kishor P. Gadkaree and Tinghong Tao.

This invention relates to removal of mercury from waste streams with an activated carbon catalyst made by intimately mixing sulfur with a synthetic carbon precursor, followed by curing, carbonizing and activating. By having the sulfur mixed with a carbon precursor, prior to the curing, carbonizing, and activating process, as opposed to with already-made activated carbon, there is more efficient removal of mercury than prior sulfur-containing activated carbon catalysts.

BACKGROUND OF THE INVENTION

Emissions of heavy metals such as Hg, Ni, Cr, Cd, Co, Pb, V, Se, Be, As, Zn, etc. have become environmental issues of increasing importance because of the dangers to human health. Mercury is a trace element of particular concern, because during coal and municipal solid waste combustion, most of the mercury present in coal and municipal solid waste is transferred into the vapor phase due to its high volatility. Currently available pollution abatement technologies are not capable of effectively controlling gas phase mercury emissions at high temperatures particularly from flue gas emissions in the utility industry. Once discharged to the atmosphere, mercury persists in the environment and creates long-term contamination problems. Furthermore, well documented food chain transport and bioaccumulation of mercury require strict control of mercury emissions from coal-fired power plant and other sources.

Present mercury emission control technologies such as adsorption using various absorbents, direct carbon injection, flue gas desulfurization technologies (FGD), wet scrubbers, wet filtration, etc. are still limited to research stages. None of these technologies have been shown to completely remove mercury, in particular elemental mercury, from gas streams, particularly above ambient temperature.

Among these technologies, adsorption on sulfur-impregnated carbon has shown some promise with removal of 50–90% mercury in flue gases depending on reaction conditions. Sulfur is introduced into activated carbon by impregnating with different forms of sulfur such as elemental sulfur, carbon disulfide, hydrogen sulfide, or sulfur dioxide. Because sulfur is deposited on the surface of the activated carbon, there are some disadvantages with either final products or the process such as 1) uniformity of the sulfur over the surface is questionable due to the heterogeneity of the carbon surface; 2) the amount of sulfur in the carbon is limited; 3) pore opening is significantly decreased after formation of the carbon-sulfur complex on the surface (pore entrance) and consequently the surface area is reduced; 4) chemical interaction between sulfur and carbon may be weak 5) introduction of other additives is restricted by competition with sulfur for surface active sites in carbon; and 6) physical shape of final carbon is limited to granules or powder.

A need exists, therefore, for a more homogeneous and efficient mercury removal catalyst. The present invention provides such a catalyst.

SUMMARY OF THE INVENTION

In accordance with one aspect of the invention, there is provided an activated carbon catalyst having sulfur dispersed homogeneously thereon, the sulfur being chemically bonded to the activated carbon.

In accordance with another aspect of the invention, there is provided a method of making the catalyst that involves forming an intimate mixture of a synthetic carbon precursor and a sulfur-containing material, curing the carbon precursor, carbonizing the carbon precursor, activating the carbonized carbon precursor to produce an activated carbon catalyst having sulfur chemically bonded to said activated carbon and uniformly dispersed thereon.

In accordance with another aspect of the invention the catalyst is used for removing mercury from mercury-containing fluid streams.

DETAILED DESCRIPTION OF THE INVENTION

Figure 1:
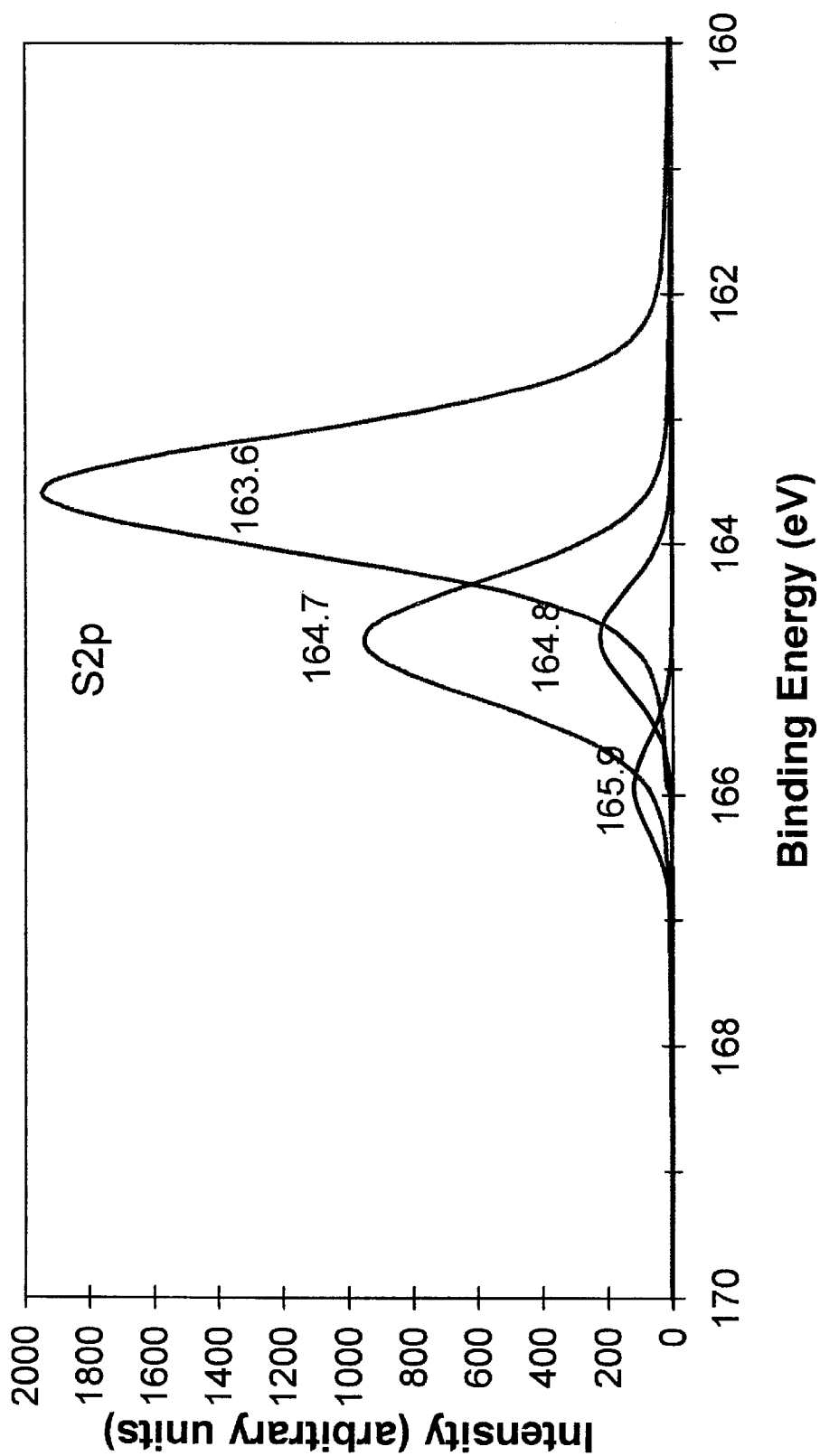
FIG. 1 is a plot showing Electron Spectroscopy Chemical Analysis (ESCA) data for the activated carbon-sulfur catalyst produced by the method described in Inventive Example 1.

This invention relates to an activated carbon catalyst having sulfur homogeneously dispersed on it and chemically bonded to it. The catalyst is made by a process that involves intimately mixing a synthetic carbon precursor with sulfur, after which the precursor is cured, carbonized and activated. The catalyst is especially suited for removing mercury, that is, either mercury compounds or elemental mercury, from waste gas streams. It is particularly efficient for removing elemental mercury.

The activated carbon with dispersed sulfur can be in the form of fine powder granules, pellets, or a monolithic body. The carbon and sulfur can be coated onto inorganic particles, flakes, or platelets such as clay, mica, or any other inorganic powdered materials or inorganic fibers, such as alumina, mullite, glass, glass ceramics, SiC, $Si_3N_4$ etc. The carbon and sulfur can be coated onto a formed substrate such as tubes, foams, or multicellular bodies. The preferred shape of carbon-sulfur monoliths and carbon-sulfur coated substrates is a multicellular structure such as a honeycomb.

By carbon precursor is meant a synthetic polymeric carbon-containing substance that converts to continuous structure carbon on heating. A carbon precursor is preferred over activated carbon particles because as a result of curing, carbonizing and activating, the carbon atoms are arranged in a continuous uninterrupted structure of random three dimensional graphitic platelets. The sulfur, by being mixed with the precursor is uniformly distributed throughout the carbon structure. The carbon structure has angstrom sized pores, typically about 5 to about 50 angstroms for reactivity, as distinguished from micron-size pores. Pores in several hundred micron size range can be present in the activated carbon.

For purposes of this invention, a synthetic polymeric carbon precursor, e.g. a synthetic resin in the form of a solution or low viscosity liquid at ambient temperatures or capable of being liquefied by heating or other means is especially useful. Synthetic polymeric carbon precursors include any liquid or liquefiable carbonaceous substances. Examples of useful carbon precursors include thermosetting resins and thermoplastic resins (e.g., polyvinylidene chloride, polyvinyl chloride, polyvinyl alcohol, and the like).

Low viscosity carbon precursors (e.g., thermosetting resins) are preferred for coating applications because their low viscosity allows greater penetration into the substrate. Typical resin viscosity ranges from about 50 to 100 cps. Any high carbon yield resin can be used. By high carbon yield is meant that greater than about 10% of the starting weight of the resin is converted to carbon on carbonization. Phenolic and furan resins are the most suitable. Phenolic resins are most preferred due to their low viscosity, high carbon yield, high degree of cross-linking upon curing relative to other precursors, and low cost. Suitable phenolic resins are resole resin such as 43250 plyophen resin, and 43290 from Occidental Chemical Corporation, and Durite resole resin from Borden Chemical Company. One especially suitable furan liquid resin is Furcab-LP from QO Chemicals Inc.

Solid resins can be used in shaping the carbon-sulfur mixtures. One especially suited solid resin is solid phenolic resin or novolak.

The carbon precursor can include a single precursor material or a mixture of two or more precursor materials. Optionally, already-made activated carbon can be added to liquid carbon precursor to adjust the viscosity of the precursor for forming or shaping into structures.

The sulfur can be provided as elemental sulfur or a sulfur compound such as hydrogen sulfide, carbon disulfide, sulfur dioxide, thiophene, sulfur anhydride, sulfur halides, sulfuric ester, sulfurous acid, sulfacid, sulfatol, sulfamic acid, sulfan, sulfanes, sulfuric acid and its salts, sulfite, sulfoacid, sulfobenzide, etc, and mixtures thereof. Fine elemental powdered sulfur is preferred such as e.g., no greater than about 100 and most preferably no greater than about 10 micrometers, average particle diameter.

The step of mixing the sulfur-containing material with the carbon precursor, whether it be a forming mixture or a coating mixture, distributes the sulfur uniformly throughout the precursor. The amount of sulfur can be controlled and there is no severe limitation on the extent of sulfur loading. The sulfur to precursor weight ratio can be anywhere from about 1:5 to 1:100. Advantageously for all embodiments, the amount of sulfur is sufficient so that the weight ratio of sulfur to carbon (or activated carbon) in the final product ranges from about 0.005:1 to 0.40:1, and more advantageously about 0.03:1 to 0.30:1. The pore opening can be controlled by activation and by introducing pore-forming materials such as polypropylene, polyester, acrylic, etc., powders or fibers that decompose in inert atmosphere at high temperature (>400° C.) to leave little or no residue. High temperature processing (>600° C.) results in a strong sulfur-carbon interaction. The sulfur is present in-situ and no additional process steps are necessary.

A co-catalyst can also be introduced into the carbon either with the precursor, or after activation. The co-catalyst can be (1) one or more catalyst metals (except alkali and alkaline earths) in the form of a precursor(s) such as a compound(s) of the metal(s), and/or (2) one or more alkali metal and/or alkaline earth metal halides. The first group significantly enhances the transfer of mercury from the gas phase to the activated carbon surface, where the reaction between sulfur and mercury occurs. The catalyst metal reduces the activation energy of reaction between mercury and sulfur and improves the reaction kinetics. The second group enhances the activity of the activated carbon catalyst.

Typical co-catalyst metals are one or more of transition metal, rare earth metal, noble metal, base metal or combinations of these.

Advantageously, the catalyst metals are Pt, Pd, Rh, Ag, Au, Fe, Re, Sn, Nb, V, Zn, Pb, Ge, As, Se, Co, Cr, Ni, Mn, Cu, Li, Mg, Ba Mo, Ru, Os, Ir, or combinations of these.

The metal co-catalyst is most typically in the form of a precursor or compound e.g. organic or inorganic salt of a catalyst metal which decomposes to the catalyst metal or catalyst metal oxide on heating such as sulfates, nitrates, etc. Examples of compounds are oxides, chlorides, (non alkali or alkaline earths) nitrates, carbonates, sulphates, complex ammonium salts, etc. Organic compounds can be e.g., organometallic compounds of the appropriate type, may also be used.

Advantageously for all embodiments, the amount of group 1 co-catalyst metal is sufficient to result in a weight ratio of co-catalyst metal to carbon in the final product of about 0.002:1 to 0.5:1, and more advantageously about 0.05:1 to 0.2:1.

Advantageously for all embodiments, the amount of group 2 alkali and/or alkaline earth metal halides is sufficient to result in a weight ratio of the group 2 co-catalysts to carbon of about 0.005:1 to 1.5:1, and more advantageously about 0.05:1 to 0.7:1.

Preferably, the weight ratio of sulfur to carbon is about 0.005:1 to 0.40:1, the weight ratio of group 1 co-catalyst metal to carbon is about 0.002:1 to 0.5:1, and the weight ratio of group 2 co-catalyst to carbon is about 0.005:1 to 1.5:1.

More preferably, the weight ratio of sulfur to carbon is about 0.03:1 to 0.30:1, the weight ratio of group 1 co-catalyst metal to carbon is about 0.05:1 to 0.2:1, and the weight ratio of group 2 co-catalyst to carbon is about 0.05:1 to 0.7:1.

One useful method of making the activated carbon with dispersed sulfur is to coat an inorganic substrate such as a honeycomb with a coating solution of the carbon precursor and the sulfur, followed by curing, carbonizing, and activating the carbon to form a continuous coating of activated carbon with homogeneously dispersed sulfur. For example, at least about 0.5% and up to about 30% by weight finely powdered (e.g. sublimed) sulfur with the balance being the precursor is dispersed in a low viscosity (about 100 cps) resole. The suspension is then coated onto a substrate, e.g. a monolithic substrate such as one made of cordierite. This is then cured at about 150° C., after drying at about 90–100° C., and then carbonized and activated at about 700–1000° C.

The substrate has an outer surface from which pores extend into the substrate. The coating penetrates into and is distributed throughout these pores as a coating thereon.

In its most useful form the monolithic substrate has means for passage of a fluid stream therethrough, e.g., a network of pores communicating from the outside to the inside, and/or thru channels extending from one end of the monolith to the other for passage of the fluid stream into one end and out through the other end.

The substrate must have enough strength to function in the application and be capable of withstanding the heat-treating temperature experienced in forming the activated carbon coating.

It is desirable that the overall open porosity of the substrate be at least about 10%, preferably greater than about 25% and most preferably greater than about 40%. For most purposes, the desirable range of porosity is about 45% to about 55%. Preferably the pores of the substrate material create "interconnecting porosity" which is characterized by pores which connect into and/or intersect other pores to create a tortuous network of porosity within the substrate.

Suitable porous substrate materials include ceramic, glass ceramic, glass, metal, clays, and combinations thereof. By combinations is meant physical or chemical combinations, eg., mixtures, compounds, or composites.

Some materials that are especially suited to the practice of the present invention, although it is to be understood that the invention is not limited to such, are those made of cordierite, mullite, clay, magnesia, and metal oxides, talc, zircon, zirconia, zirconates, zirconia-spinel, magnesium aluminosilicates, spinel, alumina, silica, silicates, borides, aluminosilicates, eg., porcelains, lithium aluminosilicates, alumina silica, feldspar, titania, fused silica, nitrides, borides, carbides, eg., silicon carbide, silicon nitride or mixtures of these. Cordierite is preferred because its coefficient of thermal expansion is comparable to that of carbon, increasing the stability of the activated carbon body. Some typical ceramic substrates are disclosed in U.S. Pat. Nos. 4,127,691 and 3,885,977. Those patents are herein incorporated by reference as filed.

Suitable metallic materials are any metal or alloy or intermetallic compound that provides durable structural service, and does not soften below about 600° C. Particularly useful are alloys which are predominantly of iron group metal (i.e. Fe, Ni, and Co), either with carbon (e.g. steels, especially stainless or high temperature steels) or without carbon. Most typical of the latter alloys for higher temperature service are those consisting essentially of iron group metal and aluminum, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders for forming substrates are disclosed in U.S. Pat. Nos. 4,992,233, 4,758,272, and 5,427,601 which are herein incorporated by reference as filed. U.S. Pat. Nos. 4,992,233 and 4,758,272 relate to methods of producing porous sintered bodies made from metal powder compositions of Fe and Al with optional additions of Sn, Cu, and Cr. U.S. Pat. No. 5,427,601 relates to porous sintered bodies having a composition consisting essentially of in percent by weight about 5 to 40 Cr, about 2 to 30 Al, 0 to about 5 of special metal, 0 to about 4 of rare earth oxide additive and the balance being iron group metal and unavoidable impurities, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanide, Zr, Hf, Ti, Si, and B, with optional additions of alkaline earths, Cu, and Sn.

The substrate is preferably a honeycomb or matrix of thin walls forming a multiplicity of open ended cells extending between the ends of the honeycomb.

Generally honeycomb cell densities range from 235 cells/cm$^2$ (about 1500 cells/in$^2$) to 1 cell/cm$^2$ (about 6 cells/in$^2$). Some examples of commonly used honeycombs in addition to these, although it is to be understood that the invention is not limited to such, are about 94 cells/cm$^2$ (about 600 cells/in$^2$), about 62 cells/cm$^2$ (about 400 cells/in$^2$), or about 47 cells/cm$^2$ (about 300 cells/in$^2$), and those having about 31 cells/cm$^2$ (about 200 cells/in$^2$). Typical wall thicknesses are for example, about 0.15 mm for about 62 cells/cm$^2$ (about 400 cells/in$^2$) honeycombs. Wall (web) thicknesses range typically from about 0.1 to about 1.5 mm. The external size and shape of the body is controlled by the application.

Cordierite honeycombs are especially preferred as substrates for the activated carbon and dispersed sulfur.

The contacting is done by any method suitable to bring the carbon precursor and catalyst material in intimate contact with the inorganic substrate. Exemplary methods of contacting include dipping the substrate in the carbon precursor/sulfur solution or slurry, or spraying the carbon precursor/sulfur solution or slurry directly on the substrate.

The eventual quantity of carbon and sulfur formed on the substrate is dependent on the amount of carbon precursor and sulfur that is retained by the substrate. The amount of carbon precursor and sulfur retained by the substrate can be increased eg., by contacting the substrate with the carbon precursor and sulfur material more than once and allowing the substrate to dry between contacting steps. In addition, the amount of carbon precursor and sulfur retained by the substrate can be controlled in porous substrates by simply modifying the overall porosity of the substrate (e.g., increasing porosity will increase the amount of precursor and sulfur retained by the substrate and in turn the amount of carbon and sulfur formed thereon).

Another useful method of making the activated carbon with dispersed sulfur is to shape a mixture of the carbon precursor, sulfur-containing material, binders and/or fillers, and forming aids, such as by extrusion.

Some binders that can be used are plasticizing temporary organic binders such as cellulose ethers. Some typical cellulose ethers are methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred.

Some fillers that are suited include both natural and synthetic, hydrophobic, and hydrophilic, fibrous and nonfibrous, carbonizable and non-carbonizable fillers.

For example some natural fillers are soft woods, e.g. pine, spruce, redwood, etc., hardwoods e.g. ash, beech, birch, maple, oak, etc., sawdust, shell fibers e.g. ground almond shell, coconut shell, apricot pit shell, peanut shell, pecan shell, walnut shell, etc., cotton fibers e.g. cotton flock, cotton fabric, cellulose fibers, cotton seed fiber, chopped vegetable fibers for example, hemp, coconut fiber, jute, sisal, and other materials such as corn cobs, citrus pulp (dried), soybean meal, peat moss, wheat flour, wool fibers, corn, potato, rice, tapioca, coal powder, activated carbon powder, etc. Some synthetic materials are regenerated cellulose, rayon fabric, cellophane, etc.

Some examples of carbonizable fillers that are especially suited for liquid resins are cellulose, cotton, wood, and sisal, or combinations of these, all of which are preferably in the form of fibers.

One especially suited carbonizable fiber filler is cellulose fiber as supplied by International Filler Corporation, North Tonawanda, N.Y. This material has the following sieve analysis: 1–2% on 40 mesh (420 micrometers), 90–95% thru 100 mesh (149 micrometers), and 55–60% thru 200 mesh (74 micrometer)

Some inorganic fillers that can be used are oxygen-containing minerals such as clays, zeolites, talc, etc., carbonates, such as calcium carbonate, alumninosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, alumina trihydrate, spinel, feldspar, attapulgites, and aluminosilicate fibers, cordierite powder, etc.

Some examples of especially suited inorganic fillers are cordierite powder, talcs, clays, and aluminosilicate fibers such as provided by Carborundum Co. Niagara Falls, N.Y. under the name of Fiberfax, and combinations of these. Fiberfax aluminosilicate fibers measure about 2–6 micrometers in diameter and about 20–50 micrometers in length.

Hydrophobic organic fillers provide additional support to the shaped structure and introduce wall porosity on carbonization because in general they leave very little carbon residue. Some hydrophobic organic fillers are polyacrylonitrile fibers, polyester fibers (flock), nylon fibers, polypropylene fibers (flock) or powder, acrylic fibers or powder, aramid fibers, polyvinyl alcohol, etc.

Some binders and fillers that are especially suited are described in U.S. Pat. No. 5,820,967. That patent is herein incorporated by reference.

Some forming e.g. extrusion aids are soaps, fatty acids such as oleic, linoleic acid, etc., polyoxyethylene stearate, etc. or combinations of these. Especially preferred is sodium stearate. Optimized amounts of extrusion aid(s) depend on the composition and binder.

Other additives that are useful for improving the extrusion and curing characteristics of the batch are phosphoric acid and oil. Phosphoric acid improves the cure rate and increases adsorption capacity. It is typically about 0.1% to 5 wt. % in the mixture. The oil addition aids in extrusion and results in increase in surface area and porosity. Oil is added typically at about 0.1 to 5 wt. % in the mixture.

The oil must be water immiscible, so that with liquid resins it can form a stable emulsion. With solid resin, a suspension is formed. Some useful oils are petroleum oils with molecular weights from about 250 to 1000, containing paraffinic and/or aromatic and/or alicyclic compounds. So called paraffinic oils composed primarily of paraffinic and alicyclic structures are preferred. These can contain additives such as rust inhibitors or oxidation inhibitors such as are commonly present in commercially available oils. Some useful oil are 3 in 1 oil from 3M Co., or 3 in 1 household oil from Reckitt and Coleman In., Wayne, N.J. Other useful oils are synthetic oils based on poly alpha olefins, esters, polyalkylene glycols, polybutenes, silicones, polyphenyl ether, CTFE oils, and other commercially available oils. Vegetable oils such as sunflower oil, sesame oil, peanut oil, etc. are also useful. Especially suited are oils having a viscosity of about 10 to 300 cps, and preferably about 10 to 150 cps.

The above ratios apply also to shaped activated carbon bodies. Generally the amount of activated carbon in the shaped body is about 10 to 98 wt %.

The carbon precursor is then subjected to heat-treatments to convert the carbon precursor to continuous carbon (carbonize). The resulting carbon is then heat-treated to activate the carbon and produce an activated carbon structure having the sulfur dispersed thereon.

When the carbon precursor is a thermosetting resin, the carbon precursor is cured prior to activation and most typically prior to carbonization. The curing is accomplished typically by heating the precursor to temperatures of about 100° C. to about 200° C. for about 0.5 to about 5.0 hours. Curing is generally performed in air at atmospheric pressures. When using certain precursors, (e.g., furfuryl alcohol) curing can be accomplished by adding a curing catalyst such as an acid catalyst at room temperature. The curing also serves to retain the uniformity of the sulfur distribution in the carbon.

Carbonization is the thermal decomposition of the carbonaceous material, thereby eliminating low molecular weight species (e.g., carbon dioxide, water, gaseous hydrocarbons, etc.) and producing a fixed carbon mass and a rudimentary pore structure in the carbon.

Such conversion or carbonization of the cured carbon precursor is accomplished typically by heating to a temperature in the range of about 600° C. to about 1000° C. for about 1 to about 10 hours in a reducing or inert atmosphere (e.g., nitrogen, argon, helium, etc.).

Curing and carbonizing the carbon precursor results in substantially uninterrupted carbon with sulfur dispersed thereon and the interaction between the sulfur and the carbon is improved. Where the carbon is in the form of a coating, the carbon coating is anchored into the porosity of the substrate and as a result is highly adherent. The top surface of the carbon coating is an uninterrupted layer of carbon to carbon bonds. If interconnecting porosity is present in the substrate, an interlocking network of carbon will be formed within the composition, resulting in an even more adherent carbon coating. The coating of uninterrupted carbon extending over the outer surface of the substrate formed provides a structure with advantages of high catalytic capability despite a relatively low carbon content, high strength, and high use temperatures. Structures can be formed which contain carbon in an amount less than and up to about 50% often less than and up to about 30% of the total weight of the substrate and carbon.

The activating is done to substantially enhance the volume and to enlarge the diameter of the micropores formed during carbonization, as well as to create new porosity. Activation creates a high surface area and in turn imparts high adsorptive capability to the structure. Activation is done by known methods such as exposing the structure to an oxidizing agent such as steam, carbon dioxide, metal chloride (e.g., zinc chloride), phosphoric acid, or potassium sulfide, at high temperatures (e.g., about 600° C. to about 1000° C.).

Activated carbon bodies or coatings derived from carbon precursors have distinct advantages over bodies and coatings made from activated carbon. Bodies made directly from activated carbon are made of discontinuous carbon which must be bound together by permanent binders; whereas resin-derived activated carbon bodies e.g. honeycombs are made of continuous carbon and do not require permanent binders. This continuous carbon structure is strong and durable and can be used in high flow rate adsorption processes. Such bodies also have durability in liquid streams. Bodies made from activated carbon particles are not durable in organic solvents and in many cases even in water, since the binder holding the structure together is water soluble. Coatings made of activated carbon particles are not as uniform or adherent as those derived from carbon precursors, and are more subject to erosion.

Furthermore, in this process, the nonuniformity of the sulfur distribution is minimized because most of the sulfur is predistributed (or in-situ) in the carbon precursor. Moreover, the sulfur is chemically bonded to the activated carbon, as opposed to being physically mixed with it as it is in prior produced activated carbon-sulfur where the sulfur is introduced into already-formed activated carbon as will be seen in the Examples and figures.

If no co-catalyst has been added up to this point, or if additional co-catalyst is desired, the activated carbon with sulfur catalyst can be treated with co-catalyst. This can be done by standard techniques such as spraying or dipping the carbon structure into a solution of the appropriate co-catalyst salts in aqueous or organic solvents and then heating typically to temperatures of about 100° C. to 600° C. for about 1 to 20 hours. This is done preferably by drying at temperatures of up to about 120° C. usually for up to about 16 hours, followed by calcining in a non-reacting atmosphere such as e.g. nitrogen for about 2 hours, such as set forth in the examples.

The activated carbon-sulfur of the present invention is especially suited as a catalyst for removal of mercury from fluid waste streams. Typically. the mercury levels in the waste streams are 0.01 to 100 mg/m$^3$. The mercury removal efficiency is very high. The catalyst is suitable for fluid streams over a wide temperature range, from ambient to about 300° C., and preferably from about 100° C. to 200° C.

To more fully illustrate the invention, the following non-limiting examples are presented. All parts, portions, and percentages are on a weight basis unless otherwise stated.

The following examples clearly show that the inventive product is significantly superior to the products from prior methods.

Inventive Example 1

About 49% Durite liquid resin from Bordon, Inc., about 19.8% Hardwood flour from American Wood Fibers, about 13.4% cordierite powder, about 4.1% Methocel®, 0.9% sodium stearate, about 9.8% finely powdered sulfur (−200 mesh), about 2% phosphoric acid, and about 1% of 3 in 1 household oil from Reckitt and Coleman, Inc, Wayne, N.J. were mixed via a Muller mixer to obtain a uniform batch. The resulting mixture was then extruded through a steel die to obtain a 62 cell/cm$^2$, (400 cell/in$^2$) 0.3 mm thick wall honeycomb.

The honeycomb was cut into smaller segments which were dried in an oven at about 90° C. and then cured at about 150° C. The fully cured honeycomb segments were then heated in nitrogen at about 900° C. and held at that temperature for about 6 hours for carbonization. After this period, carbon dioxide was introduced into the furnace and the honeycomb segments were activated at about 900° C. for about 5 hours. The segments were then cooled in nitrogen to room temperature. In this structure, the ratio of sulfur to carbon weight is about 0.10.

FIG. 1 shows the Electron Spectroscopy for Chemical Analysis (ESCA) done on the sample prepared by the above method. The data shows peaks at 165.9 eV and 164.8 eV clearly indicating that sulfur is present in a chemically bonded form with the activated carbon.

A honeycomb segment measuring about 0.95 cm (⅜") in diameter and about 2.54 cm (1") long was core-drilled and charged into a steel reactor. Nitrogen gas at about 25° C. containing about 10 mg/m$^3$ of Hg vapor was passed through with a residence time of about 1 second, and efficiency of removal of the mercury was measured as a function of time. The inventive sample had a mercury removal efficiency of about 95% at about 10 minutes and about 90% at about 60 minutes. The mercury removal capacity of the sample was about 0.20 mg/g of carbon which was determined from the beginning to the point at which efficiency dropped below about 90%.

Comparative Example 1

Carbon powders containing sulfur were prepared according to prior methods for measurement of mercury removal efficiency as follows. About 20 grams of Darco activated carbon (Norit, North America) about 40–60 mesh size and surface area of about 1200 m$^2$/g was mixed with about 2 g of finely powdered sulfur in about 46 ml aqueous solution. The water was slowly evaporated to avoid sulfur non-uniformity and the sample was dried at about 120° C. overnight. The dried sample was heated at about 400° C. for about 2 hours in nitrogen and then cooled to room temperature. The sulfur to carbon weight ratio in this case is identical to that in Inventive Example 1. This sample was then loaded in the reactor as in Inventive Example 1 in preparation for obtaining the same carbon loading in the reactor as in Inventive Example 1. Experiments were performed under identical conditions (25° C., 10 mg/m$^3$ of mercury vapor in nitrogen) to measure mercury removal. The removal efficiency was about 60% at about 30 minutes and about 50% at about 60 minutes with mercury removal capacity above the 90% level at about 0.033 mg/g of carbon.

Figure 2:
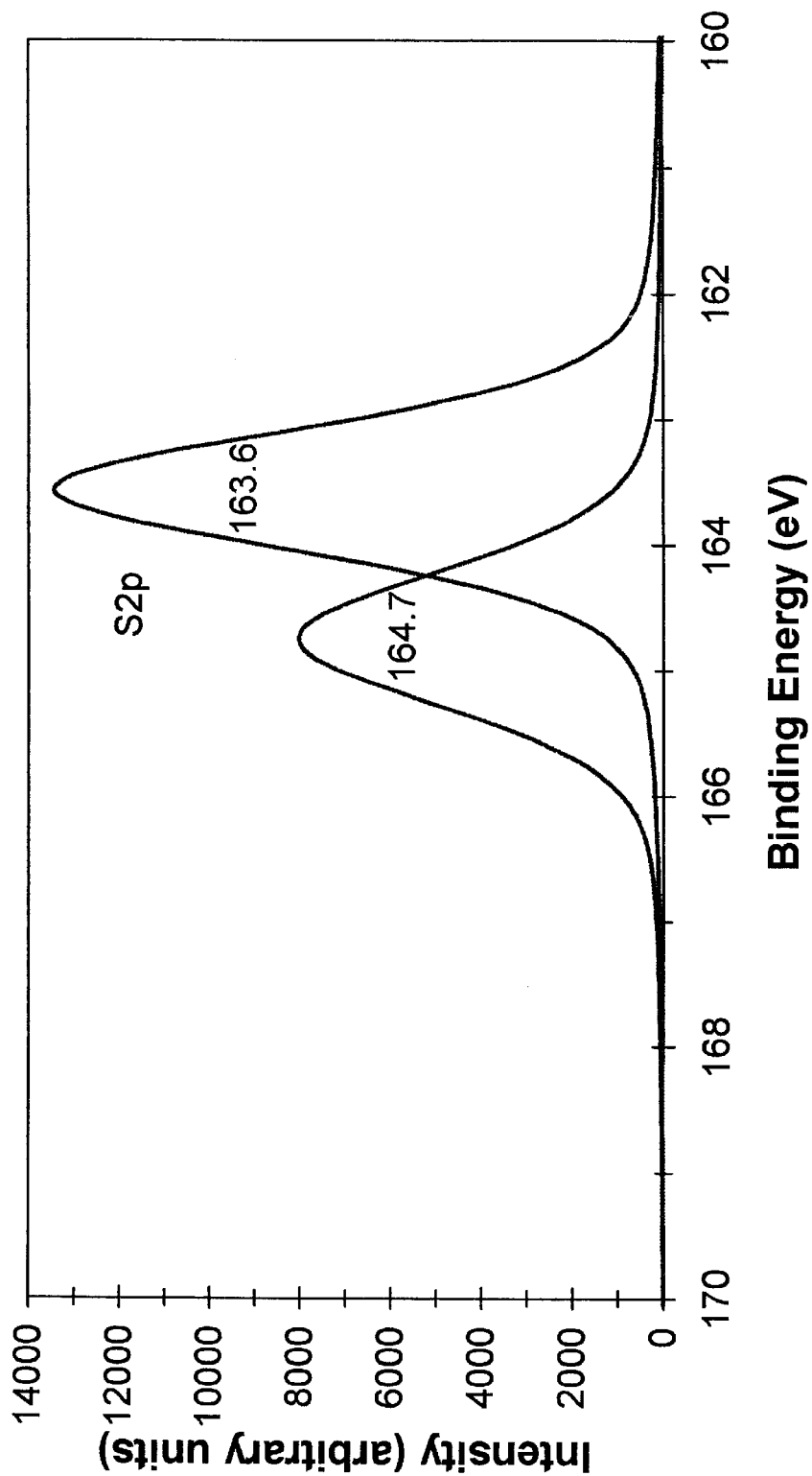
FIG. 2 is a plot showing Electron Spectroscopy Chemical Analysis (ESCA) data for the activated carbon-sulfur catalyst produced by the method described in Comparative Example 1.

FIG. 2 shows the ESCA data on the sample of this example fabricated via the traditional method. The data does not show the characteristic peak at 165.9 eV, clearly indicating that the unique chemical bonding between sulfur and carbon seen with the Inventive Example does not exist in this case.

Inventive Example 2

About 49% Durite liquid resin from Borden, Inc., about 19.8% Hardwood Flour (American Wood Fibers), about 134% cordierite, about 4.1% Methocel®, about 0.9% sodium stearate, about 9.8% finely powdered sulfur, about 2% phosphoric acid, and about 1% oil of the same type as in Inventive Example 1 were mixed in a Muller to obtain a uniform batch. The resulting mixture was then extruded through steel dies to obtain a 62 cell/cm$^2$, (400 cell/in$^2$) 0.3 mm thick wall honeycomb. The honeycomb was cut into smaller segments which were dried in an oven at about 90° C. and then cured at about 150° C. The fully cured honeycomb segments were then heated in nitrogen at about 900° C. and held a that temperature for about 6 hours for carbonization. After this period, carbon dioxide was introduced into the furnace and the honeycomb segments were activated at about 900° C. for about 5 hours. The segments were then cooled in nitrogen to room temperature. The sulfur to carbon weight ratio for this structure was about 0.10.

A honeycomb segment measuring about 0.95 cm (⅜") in diameter and about 2.54 cm (1") long was core-drilled. This sample, containing in-situ sulfur was then impregnated with about 2 ml of an aqueous solution of $Fe(SO_4)_3$ and KI, at metal concentrations of about 4.44% each. The impregnated sample was heated overnight at about 120° C. in air and then calcined at about 400° C. in nitrogen for about 2 hours and cooled to room temperature. The metal catalyst (Fe) to carbon weight ratio for this structure was about 0.10 and the potassium iodide (KI) to carbon ratio was about 0.42.

The sample thus processed was packed in a 0.95 cm (⅜") diameter stainless steel reactor. Mercury removal was carried out at about 150° C. and about 10 mg/m$^3$ of influent Hg vapor concentration in nitrogen. The residence time of Hg vapor in the honeycomb was about 1 second. The effluent was monitored for mercury breakthrough. It was found that mercury removal efficiency remained at about 100% for about 24 hours, which gives a capacity of about 2.93 mg Hg/g of carbon.

Comparative Example 2

To compare the results of Inventive Example 2 with traditional technology as described in U.S. Pat. No. 4,500,327, the following was done.

About 5 g of Darco activated carbon (Norit, North America) at about 40–60 mesh size with a surface area of about 1200 m$^2$/g was sprayed with about 10 ml of aqueous suspension containing about 0.5 g sulfur, about 1.24 g of Fe(SO$_4$)$_3$, and about 1.5 g of KI and dried at about 120° C. This results in a sample analysis analogous to the sample in Inventive Example 2.

The carbon was tested in the reactor mentioned in Example 1 under exactly the same reaction conditions (about 150° C., 10 mg/M$^3$ of mercury vapor influent, with the same residence time of about 1 second. Mercury removal efficiency of about 100% was obtained for only about 1 minute. The removal efficiency dropped to about 90% in about 5 minutes and down to about 50% in about ten minutes. At about 100% efficiency, the mercury removal capacity was only about 0.021 mg/g of carbon. These comparative examples show that the inventive product has several fold higher mercury removal capacity at 100% efficiency.

The above examples show that the inventive technology results in unexpectedly high performance compared to traditional methods.

Inventive Example 3

About 20% elemental sulfur (–200 mesh) was mixed with 80% Durite liquid phenolic resin. A cordierite honeycomb with about a 62 cell/cm$^2$, (400 cell/in$^2$) 0.13 mm thick walls with about 50% wall porosity was dipped in the sulfur-resin mixture. The mixture was allowed to soak into the honeycomb for about 5 minutes. The honeycomb was removed from the liquid, drained of excess liquid in the cells, and then dried and cured at about 95° C. and 150° C. respectively. The cured honeycomb was carbonized and activated as described in Example 1. The activated carbon-sulfur coated honeycomb was then subjected to the mercury removal test described in Example 1. The mercury removal capacity in this case was about 0.181 mg/g of carbon, which is above about 90% mercury removal efficiency. The sulfur to carbon weight ratio was about 0.10.

Inventive Example 4

A sample identical to that in Inventive Example 2 was tested as described in Example 2, but at about 0.1 second residence time compared to the 1 second residence time in that example for mercury removal efficiency. At this 0.1 second residence time, about 100% mercury removal efficiency was obtained for about 1 hour. The efficiency gradually decreased to about 90% at about 2 hours and to about 70% at about 9 hours.

Inventive Example 5

A sample identical to that in Inventive Example 2 was made but was impregnated with about 6.38% Fe and about 6.38% KI, instead of the 4.44% Fe and 4.44% KI as in that example. This sample was tested as described in Example 4, at 0.1 second residence time. The mercury removal efficiency of this sample was about 100% for about 6 hours compared to about 1 hour in Example 4, indicating that higher level of impregnation increases mercury removal. The weight ratio of sulfur to carbon was about 0.10 in this case and the weight ratio of Fe to carbon was about 0.15 and the weight ratio of KI to carbon was about 0.63.

Inventive Example 6

A sample identical to the ones in Examples 4 and 5 was made except that it was impregnated with about 4.2% SnCl$_2$, about 4.2% FeSO$_4$, and about 4.2% KI. The SnCl$_2$ was added to evaluate the effect of mixed metals. The sample performance was evaluated at about 0.1 second residence time as in Examples 4 and 5. The sample gave about a 100% mercury removal efficiency for about 10 hours. This example shows the beneficial effect of mixed metals on mercury removal. The sulfur to carbon ratio in this case was about 0.10, the mixed metal co-catalyst (i.e. Fe+Sn) to carbon ratio was about 0.20, and the KI to carbon ratio was about 0.42.

Inventive Example 7

A sample identical to that in Example 6 was evaluated for mercury removal efficiency at about 0.1 second residence time with about 10 mg/m$^3$ Hg in the effluent stream, with the carrier gas composition of about 21 vol. % oxygen and about 79 vol. % nitrogen instead of 100% nitrogen used in the previous examples. The sample gave about 100% mercury removal efficiency for about 32 hours, which is significantly higher than 10 hours at 100% efficiency with 100% nitrogen as the carrier gas as in Example 6. This example shows the beneficial effect of oxygen in the carrier gas.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of removing mercury from a mercury-containing fluid stream, the method comprising passing the stream over an activated carbon catalyst having sulfur chemically bonded to said activated carbon and uniformly dispersed thereon to cause removal of essentially all of the mercury from the stream.

2. A method of claim 1 wherein the temperature of the fluid stream ranges from ambient temperature to about 300° C.

3. A method of claim 2 wherein the temperature of the fluid stream is about 100° C. to about 200° C.

\* \* \* \* \*